United States Patent [19]
Kuzma

[11] Patent Number: 5,892,542
[45] Date of Patent: Apr. 6, 1999

[54] SECTIONAL RASTER OUTPUT IMAGE SENSOR

[75] Inventor: Andrew Kuzma, Portland, Oreg.

[73] Assignee: Intel Corporation, Santa Clara, Calif.

[21] Appl. No.: 757,955

[22] Filed: Nov. 22, 1996

Related U.S. Application Data

[63] Continuation of Ser. No. 411,399, Mar. 28, 1995, abandoned, which is a continuation of Ser. No. 257,375, Jun. 9, 1994, abandoned.

[51] Int. Cl.⁶ .................................................. H04N 3/14
[52] U.S. Cl. .............................................. 348/311; 348/315
[58] Field of Search ................................. 348/302, 303, 348/311, 315, 316, 319, 321; 257/231, 240, 241, 242

[56] References Cited

U.S. PATENT DOCUMENTS

| | | | |
|---|---|---|---|
| 4,001,878 | 1/1977 | Weimer | 348/280 |
| 4,103,347 | 7/1978 | Barton | 365/219 |
| 4,581,652 | 4/1986 | Kinoshita et al. | 348/317 |
| 4,980,771 | 12/1990 | Ueda et al. | 348/323 |
| 5,210,613 | 5/1993 | Lee | 348/315 |
| 5,285,286 | 2/1994 | Kannegundla | 348/187 |
| 5,317,408 | 5/1994 | Hirota | 348/315 |
| 5,355,165 | 10/1994 | Kosonocky et al. | 348/311 |

*Primary Examiner*—Wendy Garber
*Assistant Examiner*—Jacqueline Wilson
*Attorney, Agent, or Firm*—Blakely, Sokoloff, Taylor & Zafman

[57] ABSTRACT

A method and apparatus for converting light images into a series of charge stores that are output in predetermined subsections is described. An integrated circuit is provided having multiple light sensitive elements embedded on its surface. These light sensitive elements are coupled to the input gates of a series of charge-coupled devices that can be clocked in a manner that allows various charge stores created by the light sensitive elements to be sampled. The charge coupled devices are configured in a manner that causes the charge stores created by the light sensitive elements to be extracted in an order that corresponds to rows of subsections of an image.

17 Claims, 6 Drawing Sheets

SECTIONAL RASTER OUTPUT IMAGE SENSOR

This is a continuation of application Ser. No. 08/411,399 filed Mar. 28, 1995, now abandoned, which is a continuation of appplication Ser. No. 08/257,375, Jun. 9, 1994, now abandoned.

BACKGROUND OF THE INVENTION

1. Field of the Invention

The described invention relates generally to the field of image sensing and recording. More particularly, it relates to an image sensor that outputs data in a sectional raster form.

2. Prior Art

FIG. 1 is an illustration of a popular method for capturing images used in a video camera. The light from light source 2 reflects from person 10 onto lens 12 where it is focused on image sensing integrated circuit 14. With the help of control circuitry 16, image sensing integrated circuit 14 produces a series of voltages that correspond to the light levels experienced at various evenly distributed locations, called pixels, located across image sensing integrated circuit 14. Formatting circuitry 18 converts these voltage levels into a standard, readily recordable and transmittable signal and provides this signal to either tape 20 or another system through output 22. The format of this signal usually corresponds to the National Television Standards Committee ("NTSC") transmission signal standard or the VHS video recording standard.

FIG. 2 is an illustration of the interlaced raster scan output pattern defined by the NTSC transmission standard. In order to create an image on a video tube, an electron beam is scanned across the display surface of the video tube in a manner that reproduces the light levels created by the original image on the surface of the video tube. The NTSC standard calls for 525 lines to be traced 30 times each second in two interlaced sets of 262.5 lines. The first 21 lines of each set of 262.5 lines are blanked to allow for the transmission of the vertical scanning synchronization signal as well as other information signals. Reference numeral 201 indicates the start of the first visible line of the first set of 262.5 lines at the top left hand corner of the screen. The solid lines indicate the path traced out by the first set of 262.5 lines, the end of which is indicated by reference numeral 202. Once this first scan is completed, the second scan begins at a point indicated by reference numeral 203, at the center of the top of the screen. The dotted lines indicate the second set of 262.5 lines traced out in an interlaced fashion to the first set of 262.5 lines. The result is a flicker free image of 483 visible lines of picture information that is updated 30 times per second.

FIG. 3 is an illustration of image sensing integrated circuit 14 from FIG. 1. Light sensitive diodes 300 are placed at the input gates 302 of charge-coupled device ("CCD") arrays 304. As the light is focused through lens 12 onto image sensing integrated circuit 14, the voltage created by light sensitive diodes 300 generate charge stores in the substrate of integrated circuit 14. By the proper application of gating signals on control inputs 320, these charge stores are transferred into CCD arrays 304 in parallel fashion by input gates 302. Once in CCD array 304, the charge stores are shifted up serially with the top row of charge stores being transferred in parallel fashion through gates 308 into CCD array 310. The charge stores in CCD array 310 are then shifted to the right serially through gate 312 into output amplifier 314 which generates voltages in proportion to the charge stores. Another row of charge stores are then shifted up from CCD arrays 304 and once again shifted out until all the charge stores from CCD arrays 304 are removed and the generation of an image is complete.

By providing the charge stores this row by row fashion, the voltage levels provided by the charge stores are easily converted into a conventional raster scan NTSC transmission signal. To provide interlacing, the odd numbered ones of gates 302 are first activated, with the resulting charge stores being passed to CCD array 310, and then the even numbered ones of gates 302 are activated with the resulting charge stores being similarly passed to CCD array 310 for outputting. While only a single light sensitive diode 300 is shown at each pixel location, various implementations can incorporate multiple diodes which correspond to a single pixel location. Generally, the greater the number of diodes, the better the quality of the image produced. Additionally, multiple diodes that are sensitive to different frequencies of light can be incorporated for the production of color images.

The image sensing integrated circuit 14 shown in FIG. 3 is configured to output a set of voltage levels in a manner that can easily be converted to NTSC signal that provides two interlaced scan patterns. In the past, this configuration was desirable because the NTSC standard is the most widely used to broadcast images in the U.S. More recently, however, it has become desirable to store and transmit images in digital format where each pixel of information is represented by a number of bits. The use of a digital format allows images to be compressed so that they may be transmitted over standard telephone lines or other wire media. Additionally, digital images can be manipulated by computers and other digital processing devices that provide enhanced flexibility and control over past methods for image manipulation.

Common to many of these data compression and manipulation techniques is the division of a single frame of image data into subsections to which the various signal processing algorithms are applied. Because an image is processed in these subsections, manipulation of the image cannot begin until at least one subsection of the image becomes available to a microprocessor or other image manipulation circuit. Since the prior art image sensing circuit provides the image in a line by line fashion, much additional information must be provided and stored before a properly shaped subsection can be constructed. This storage delays image processing and requires image manipulation systems to have storage circuitry. In order to better pipeline this image processing, and reduce the amount of storage circuitry required in an image generation system, an image sensing integrated circuit that provides data in subsections is desirable.

BRIEF SUMMARY OF THE INVENTION

The described invention is a method and apparatus for converting light images into a series of charge stores that are output in predetermined subsections. In accordance with one aspect of the invention, an integrated circuit is provided having multiple light sensitive elements embedded on its surface. These light sensitive elements are coupled to the input gates of a series of charge-coupled devices that can be clocked in a manner that allows various charge stores created by the light sensitive elements to be sampled. The charge coupled devices are configured in a manner that causes the charge stores created by the light sensitive elements to be extracted in an order corresponding to rows of subsections of an image.

DETAILED DESCRIPTION OF THE INVENTION

A method and apparatus for sensing light images that outputs voltage levels in a block raster format is disclosed. In the following description for purposes of explanation, specific details such as image generation system configuration and integrated circuit design are set forth in order to provide a thorough understanding of the invention. However, it will be apparent to one skilled in the art that the present invention may be practiced without these specific details. In other instances, well known structures, devices, functions and procedures are shown in block diagram form in order to avoid obscuring the present invention. It should be noted that the present invention can be applied to a variety of different image generation systems and can be practiced in a variety of different manners such as in scanners and digital still photography cameras.

Figure 4:
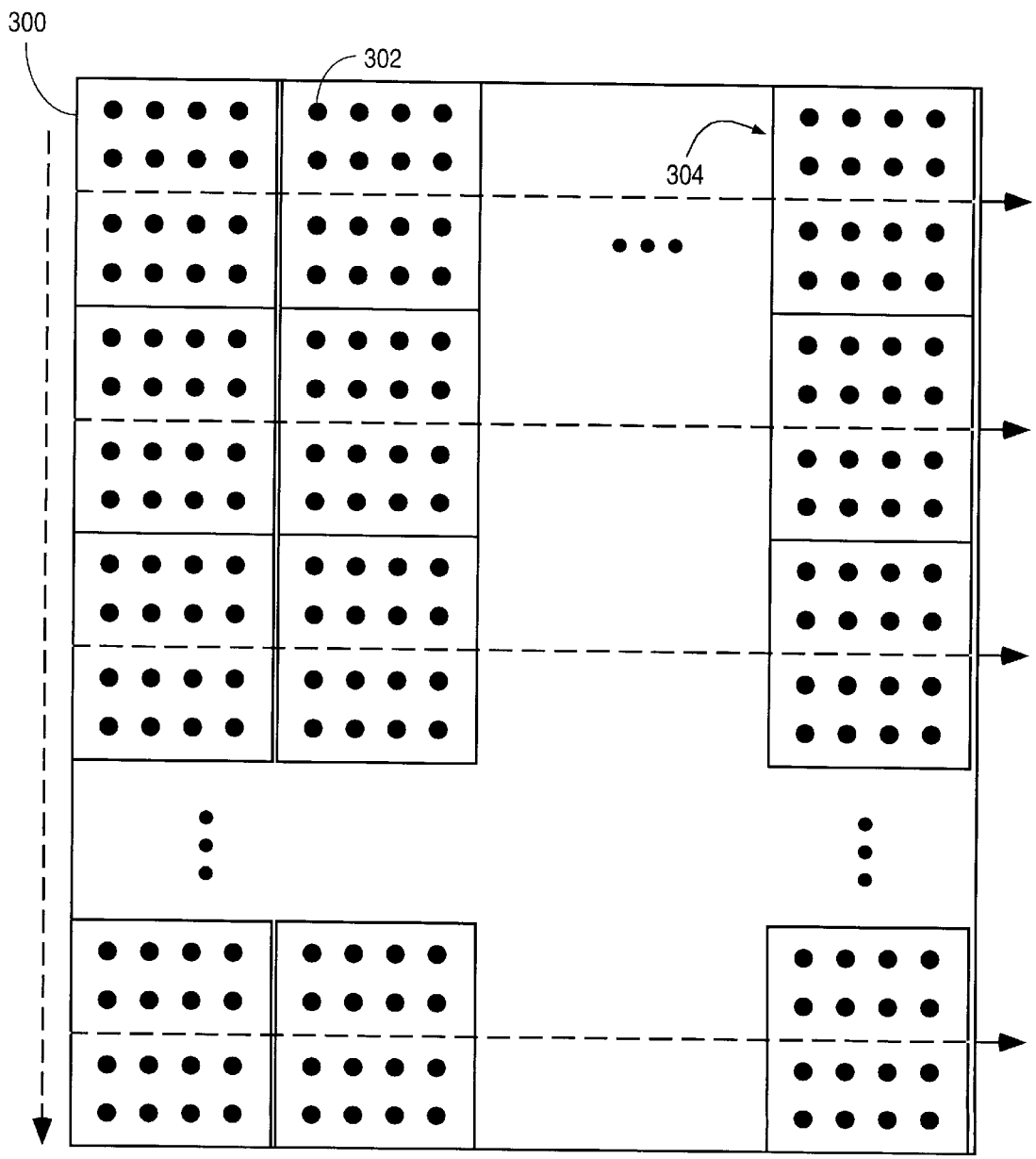
FIG. 4 is a block diagram illustrating the order in which the multiple pixels that make up an image are output by an image generation device configured in accordance with the described embodiment of the invention.

FIG. 4 is a block diagram illustrating how the multiple pixels 302 that make up an image in a video frame are divided into block shaped subsections 304 that can then be processed using various image manipulation algorithms. These manipulation algorithms include motion estimation and image transforms such as conversion from complementary color format to video format. As images are recorded and displayed subsections 304 are usually manipulated in an order indicated by the arrows pointing in a left to right direction and a top to bottom direction, although other orders of manipulation are feasible. To allow circuitry performing these manipulations to begin processing as soon as sufficient data is available, the pixels should be provided in the block shaped subsections shown by any circuitry which is generating it.

Figure 5:
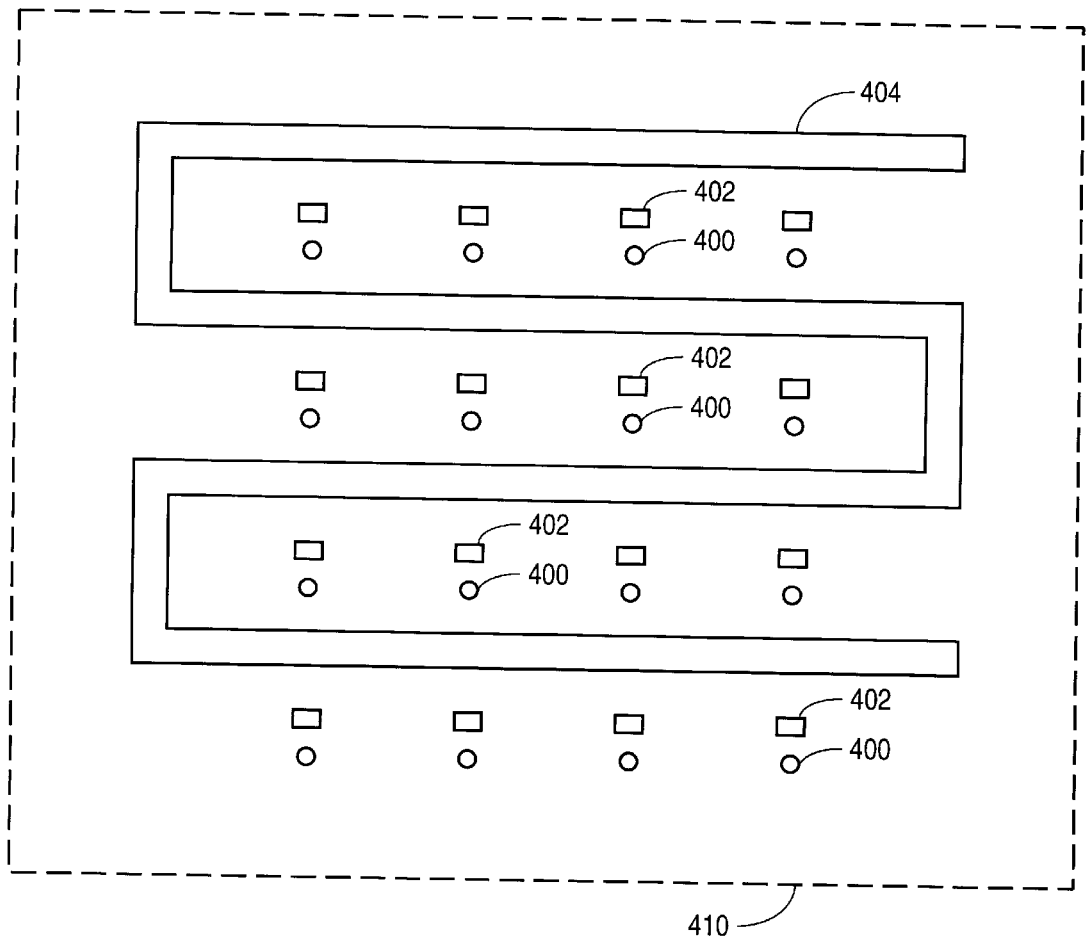
FIG. 5 is an illustration of a circuit used to implement an image sensing integrated circuit configured in accordance with the described embodiment of the invention.

FIG. 5 is an illustration of a circuit 410 used to implement an image sensing integrated circuit configured in accordance with one embodiment of the invention. Sixteen light sensitive diodes 400 are distributed evenly across substrate in which the circuit is created. Gates 402 couple light sensitive diodes 400 to CCD array 404 which is interwoven among the light sensitive diodes. Over time, the light detected by diodes 400 generate charge stores (or charge depletion regions if the substrate is back-biased) within the substrate. When an image is to be generated, gates 402 are activated and the charge stores are passed to CCD array 404 in parallel fashion. These voltage levels are then serially clocked out of the top end of CCD array 404 and provided to other circuitry. While sixteen light sensitive diodes 400 are shown, other embodiments may include different numbers of light sensitive diodes arranged in a differently configured subsection.

Figure 6:
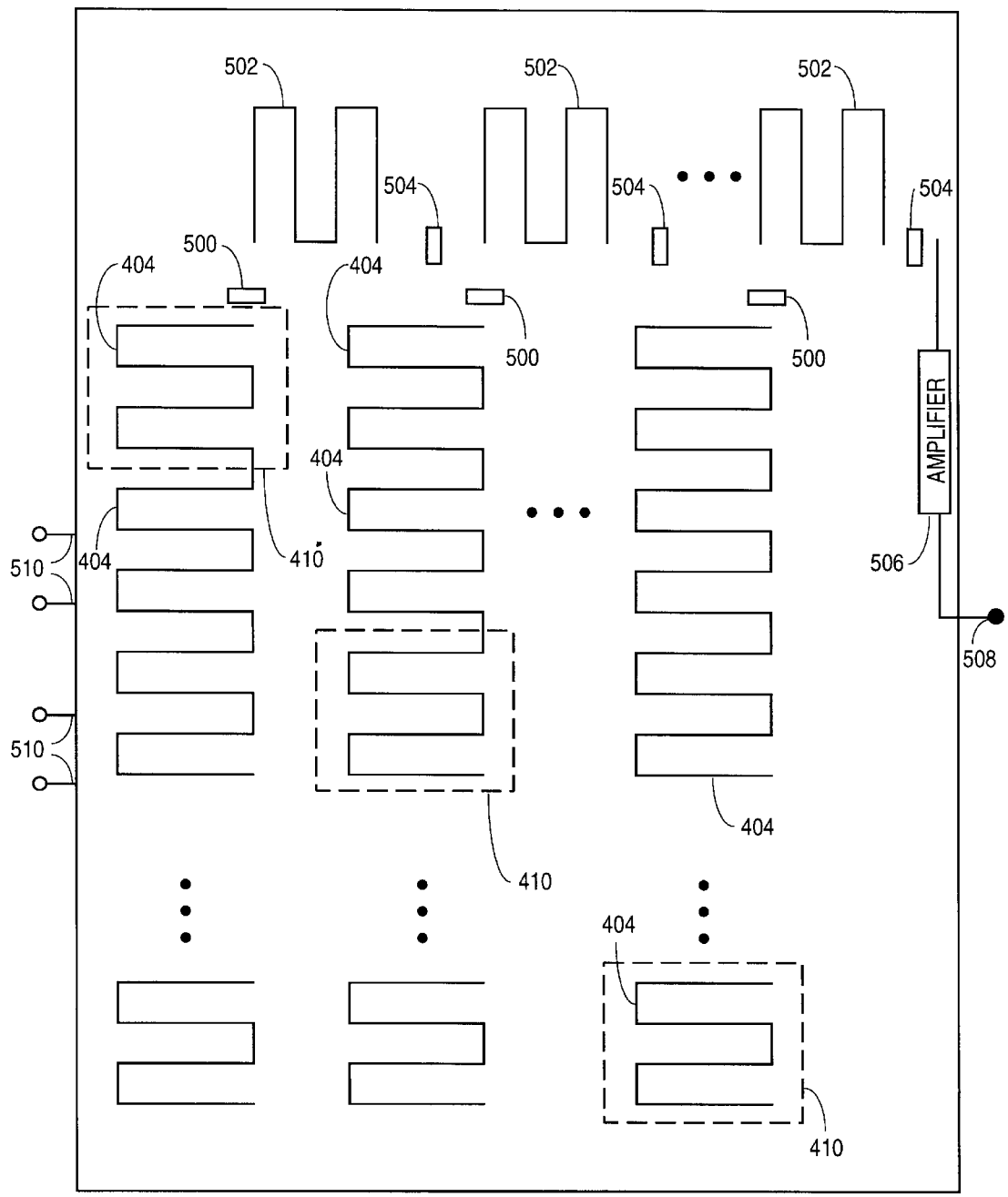
FIG. 6 is an illustration of a light sensing integrated circuit configured in accordance with the described embodiment of the invention.

FIG. 6 is an illustration of a light sensing integrated circuit configured in accordance with one embodiment of the invention. Circuits 410 are configured in vertical columns with CCD arrays 404 of each circuit 410 coupled together at the top and bottom ends. Gates 500 couple these vertical columns to CCD arrays 502 which are coupled together horizontally through gates 504 forming a row at the top of the integrated circuit. Amplifier 506 is coupled to the CCD gate array 502 located at the right end of the row through one of gates 504.

When an image is to be generated, gates 402 (not shown for ease of drawing) are activated via control nodes 510 causing the charge stores produced by light sensitive diodes 400 (also not shown) to be passed into the columns of CCD arrays 404. The charge stores located in the top row of CCD arrays 404 are then passed through gates 500 into CCD arrays 502. The charge stores generated by the remaining CCD arrays 404 are passed up within a column to the CCD arrays 404 located above.

After the charge stores from the top row of circuits 410 have been passed to CCD arrays 502, gates 500 are deactivated and gates 504 are activated so that the charge stores in CCD array 502 are passed to amplifier 506 and output node 508. Once the charge stores contained in CCD arrays 502 have been output, gates 500 are reactivated until the next set of charge stores from the top row of circuits 410 are passed into CCD arrays 502. These charge stores are again passed to amplifier 506 using gates 504. This process continues until all the charge stores for an image have been output. Amplifier 506 senses the voltage potentials created by these charge stores, and generates a series of voltage levels that are then manipulated and transmitted by various circuits coupled to output node 508 of the light sensitive integrated circuit. Thus, the voltage levels associated with the various pixel locations are output in a manner consistent with that shown in FIG. 4.

Figure 1:
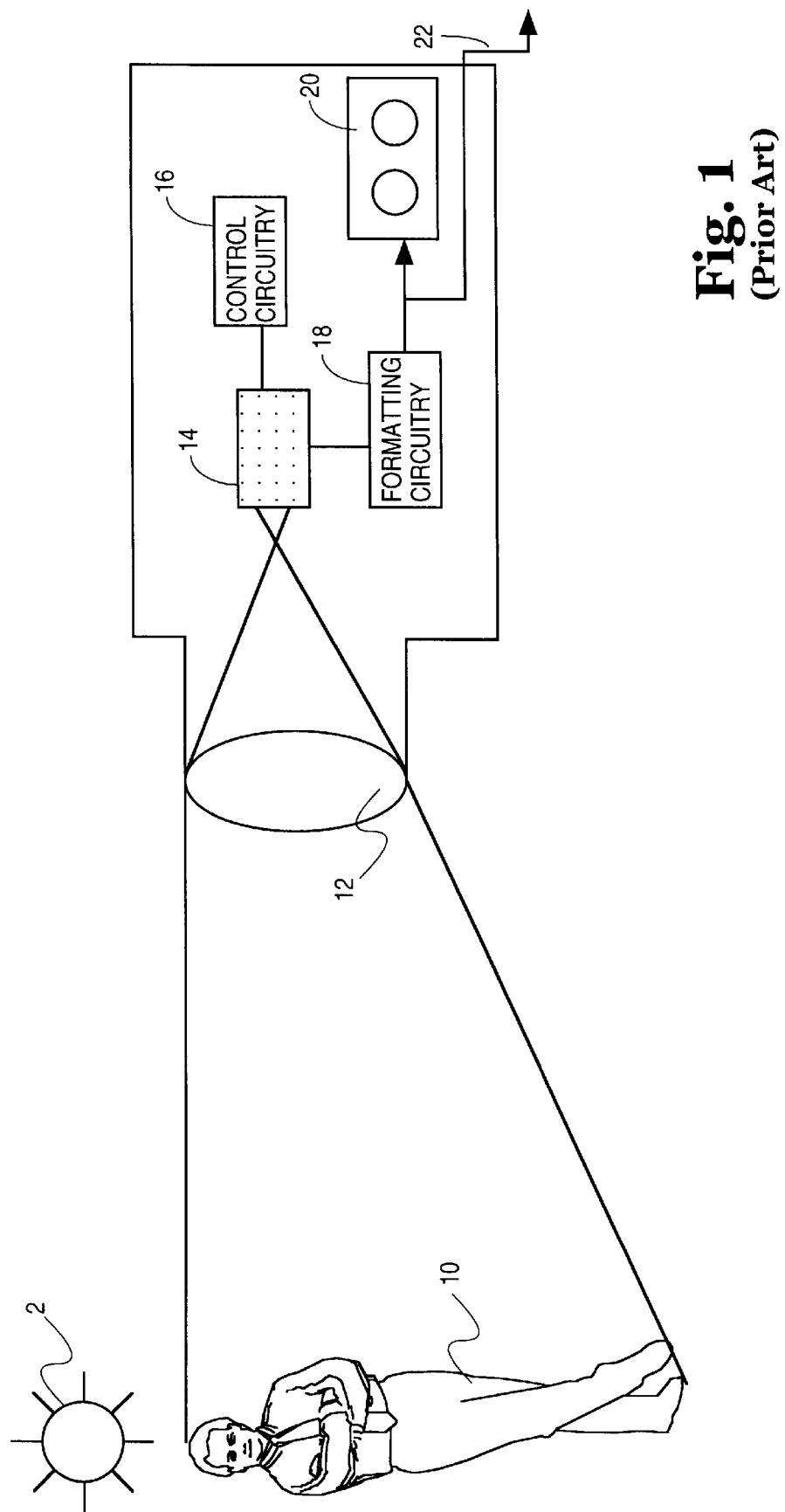
FIG. 1 is an illustration of the prior art method for capturing images in a video camera.
Figure 2:
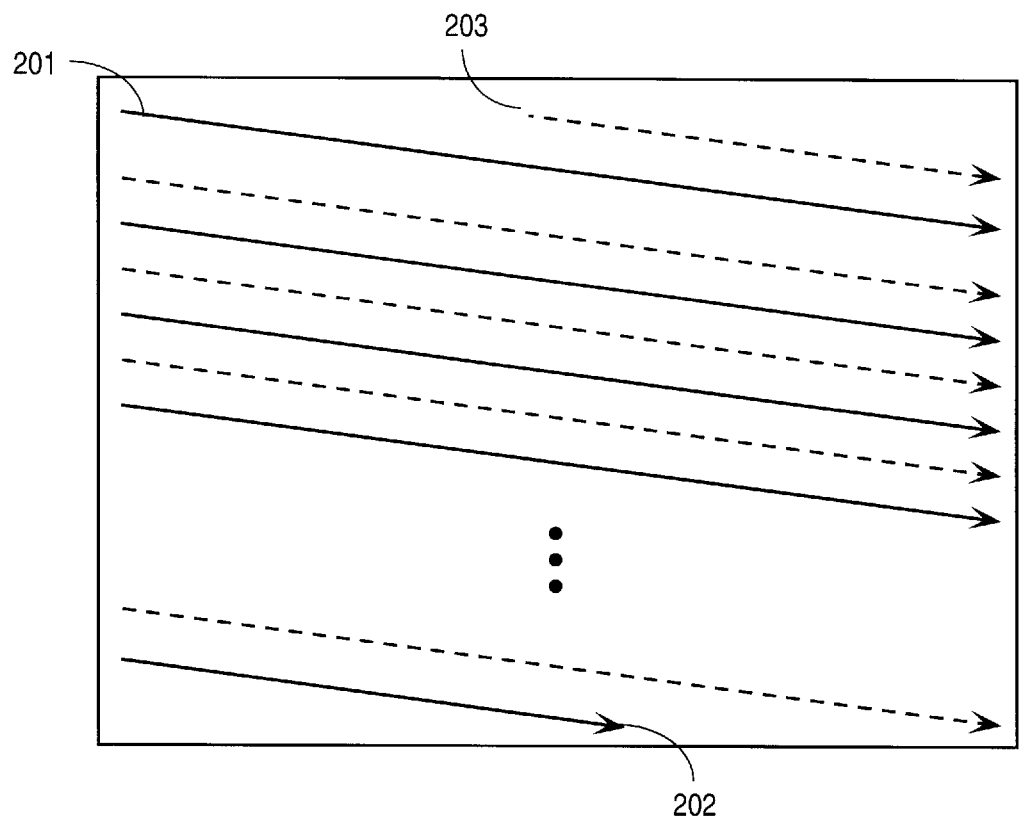
FIG. 2 is an illustration of the interlaced raster scan output pattern defined by the NTSC transmission standard.
Figure 3:
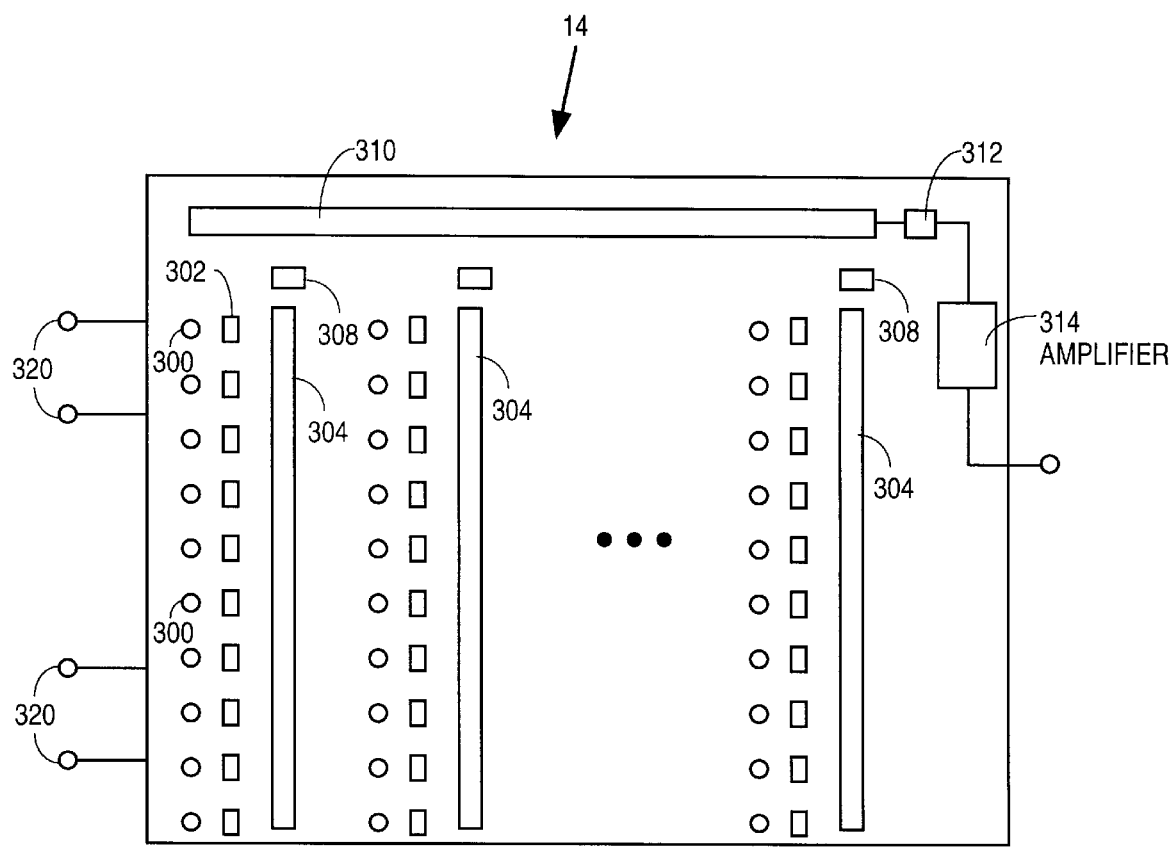
FIG. 3 is an illustration of the prior art configuration of image sensing integrated circuit 14 shown in FIG. 1.

By incorporating an image sensitivity surface as described above in a video image generation system like that shown in FIG. 1, image processing and manipulation can be performed with minimal additional circuitry and hardware. Constructing a subsection of an image from a set of raster scan lines generated by the prior art circuit utilizes a significant amount of memory because the information for an entire row of blocks must be provided before a single subsection can be constructed. If each pixel requires eight bits of representation, each line will need 720 bytes of storage. Since nearly 16 lines must be acquired before processing can begin using the standard display method, total storage is on the order of 11,520 bytes. When it becomes possible to process subsections of an image of data at a rate equal to or greater than the rate of data collection, the need for intermediate memory storage between data gathering and data processing can be eliminated.

In the future, video cameras incorporating the charge coupled device block method could incorporate motion estimation and transform coding within the electronics of the camera, perhaps using a digital signal processor. This allows for reduction of noise by processing the analog data completely in the digital domain, rather than the common analog processing done today, as well as reduces the camera cost by removing components and assembly adjustments. Also, the use of a digital signal processor would allow for automatic camera color alignment, and video scaling to pixel formats other than the cameras apparent image resolution.

Thus, a method and apparatus for sensing images that outputs information in rows of subsections as opposed to scan lines has been described. It will be apparent to one skilled in the art that various embodiments of the invention are possible other than the one disclosed. In general, the exemplary embodiment described herein is merely illustrative of the invention, and should not be taken as limiting the scope.

What is claimed is:

1. An apparatus for sensing an image comprising:
    means for creating a set of charge stores that correspond to light levels at a plurality of locations on a surface at an instant in time, the set of charge stores being divided into a plurality of subsets with each subset of the plurality of subsets corresponding to the light levels at a two-dimensional contiguous subsection of the surface at the instant in time;
    means for delivering the subsets of the set of charge stores from a first set of charge storage locations to a second set of charge storage locations, the second set including a plurality of subsets; and
    means for outputting said subsets of said set of charge stores from said second set of charge storage locations, said means for outputting including means for communicating between said subsets of said second set of charge storage locations wherein said means for delivering comprises: a set of charge coupled devices configured to deliver said set of charge stores in subsets wherein some of said set of charge coupled devices are interwoven among a set of light sensitive diodes.

2. The apparatus set forth in claim 1, wherein said means for creating comprises:
    a set of light sensitive diodes.

3. The apparatus of claim 2, wherein said plurality of vertical sets are electrically isolated from one another,
    each of said plurality of vertical sets having one of said subsets of said first set so that said subsets of said first set are electrically isolated from one another; and
    wherein said second set of charge storage locations includes a horizontal set of charge coupled devices.

4. The apparatus of claim 1, wherein said two dimensional subsection comprises:
    a block shaped section
    wherein said first set of charge storage locations has a greater number of subsets than that of said second set of charge storage locations.

5. The apparatus of claim 1, wherein said subsets of said second set of charge storage locations are electrically coupleable to one another.

6. The apparatus of claim 1, wherein said means for communicating includes gates between said subsets of said second set of charge storage locations to pass charge stores between said subsets of said second set of charge storage locations.

7. An apparatus for sensing an image comprising:
    a set of light sensitive elements for creating a set of charge stores that corresponds to the light levels at various locations on a surface;
    a first set of charge storage locations having two-dimensional subsets, said subsets of said first set of charge storage locations for storing subsets of said set of charge stores, each of said subsets of said set of charge stores storing charges corresponding to light levels during an instant in time at a two-dimensional subsection of said surface; and
    a second set of charge storage locations having two-dimensional subsets, said subsets of said second set of charge storage locations for receiving said subsets of said set of charge stores in parallel from said subsets of said first set of charge storage locations, said second set being electrically coupleable to said first set wherein said first set of charge storage locations include a plurality of vertical sets of charge coupled devices interwoven among said set of light sensitive elements, such that each subset of the first set receives input from a plurality of the light sensitive elements in the two-dimensional subsection of the surface.

8. The apparatus of claim 7 further comprising means for communicating between said subsets of said second set of charge storage locations
    wherein said first and second sets of charge storage locations each include a set of charge coupled devices.

9. The apparatus of claim 8, wherein said means for communicating includes gates to pass charges between said subsets of said second set of charge storage locations.

10. The apparatus as set forth in claim 7, wherein said set of light sensitive elements comprises:
    a set of light sensitive diodes.

11. The apparatus of claim 7, wherein said two-dimensional subsection comprises:
    a block shaped section.

12. The apparatus of claim 7, wherein said first set of charge storage locations includes a plurality of vertical sets of charge coupled devices interwoven among said set of light sensitive elements, such that each subset of the first set receives input from a plurality of the light sensitive elements in the two-dimensional subsection of the surface,
    said plurality of vertical sets being electrically isolated from one another,
    each of said plurality of vertical sets having one of said subsets of said first set so that said subsets of said first set are electrically isolated from one another; and
    wherein said second set of charge storage locations includes a horizontal set of charge coupled devices to store a row of said subsets of said set of charge stores.

13. The apparatus of claim 7, wherein said subsets of said second set of charge storage locations are electrically coupleable to one another.

14. The apparatus of claim 7, wherein said first set of charge storage locations includes a plurality of vertical sets of charge coupled devices;
    wherein said subsets of said second set of charge storage locations are electrically coupleable to one another; and
    wherein each of said plurality of vertical sets communicates with its corresponding one of said subsets of said second set of charge storage locations.

15. A method for sensing an image comprising the steps of:
    creating a set of charge stores that correspond to light levels at a plurality of locations on a surface at an instant in time; the set of charge stores being divided into a plurality of subsets with each subset of the plurality of subsets corresponding to the light levels at a two-dimensional subsection of the surface at the instant in time; and
    delivering the subsets of the set of charge stores from a first set of charge storage locations to a second set of charge storage locations wherein said first set of charge storage locations includes a plurality of vertical sets of charge coupled devices interwoven among said set of light sensitive diodes.

16. The method set forth in claim 15, wherein said set of charge stores are created by a set of light sensitive diodes;

wherein said first set of charge storage locations includes a plurality of vertical sets of charge coupled devices interwoven among said set of light sensitive diodes, said plurality of vertical sets being electrically isolated from one another, each of said plurality of vertical sets having one of said subsets of said first set so that said subsets of said first set are electrically isolated from one another; and wherein said second set of charge storage locations includes a horizontal set of charge coupled devices.

17. The method set forth in claim 15 further comprising:

outputting said subsets of said set of charge stores from said second set of charge storage locations, said step of outputting including the step of activating a first step of gates to pass charges between a plurality of subsets of said second set of charge storage locations;

wherein the step of delivering includes the steps of (a) activating a second set of gates to transfer said subsets of said set of charge stores from said subsets of said first set to said subsets of said second set and (b) deactivating said second set of gates when the transfer is complete.

* * * * *